United States Patent [19]

Bourrain et al.

[11] Patent Number: 4,902,780
[45] Date of Patent: Feb. 20, 1990

[54] PROCESS FOR PURIFYING STYRENE/VINYLPYRIDINE COPOLYMER USING SUPERCRITICAL CARBON DIOXIDE

[75] Inventors: Paul Bourrain, Dardilly; Gérard Collas, Caluire; Jean-Francois Rostaing, Vienne; Francois Sagi, Lyons, all of France

[73] Assignee: Rhone-Poulenc Sante, Courbevoie, France

[21] Appl. No.: 385,956

[22] Filed: Jul. 28, 1989

Related U.S. Application Data

[63] Continuation of Ser. No. 156,608, Feb. 17, 1988, abandoned.

[30] Foreign Application Priority Data

Feb. 19, 1987 [FR] France ............................. 87 02114

[51] Int. Cl.$^4$ ............................................. C08F 6/00
[52] U.S. Cl. ................................. 528/483; 528/490; 528/503; 526/265
[58] Field of Search ................. 526/483, 490, 503, 265

[56] References Cited

U.S. PATENT DOCUMENTS

| | | | |
|---|---|---|---|
| 4,695,621 | 9/1987 | Allada | 528/483 |
| 4,703,105 | 10/1987 | Allada | 528/483 |
| 4,725,667 | 2/1988 | Kleintjens | 528/483 |

OTHER PUBLICATIONS

Encyclopedia of Chem. Tech., J. Wiley and Sons, Inc., 803 (1968).
Translation of German Offen. No. 3,323,940 to Braun et al., laid open, Jan. 1, 1985.

*Primary Examiner*—Joseph L. Schofer
*Assistant Examiner*—F. M. Teskin
*Attorney, Agent, or Firm*—Stevens, Davis, Miller & Mosher

[57] ABSTRACT

A basic copolymer of styrene with vinylpyridine is purified by extraction with supercritical carbon dioxide to remove residual monomers.

2 Claims, No Drawings

PROCESS FOR PURIFYING STYRENE/VINYLPYRIDINE COPOLYMER USING SUPERCRITICAL CARBON DIOXIDE

This application is a continuation of application Ser. No. 156,608 filed Feb. 17, 1988, now abandoned.

The present invention relates to the purification of basic copolymers, and more particularly to the removal of residual monomers from copolymers of styrene and a vinylpyridine, especially copolymers of styrene and 2-vinyl-, 4-vinyl-, or 2-methyl-5-vinyl-pyridine containing 10 to 50 weight percent of styrene units and preferably having a number average molecular mass of 100,000 to 150,000.

It is known, e.g., from European Patent Application EP 77,264 and EP 188,953, to prepare compositions intended for feeding ruminants in which the active substance, e.g. an essential aminoacid such as methionine or lysine, is coated with a composition which is stable in a medium in which the pH is above 5.5 and which enables the active substance to be released into a medium in which the pH is below 3.5. Among coating constituents, basic copolymers, such as copolymers of styrene with vinylpyridines, are used.

Copolymers which are obtained by the customary polymerization processes are generally contaminated with residual monomers and with oligomers, and possibly with degradation of the polymerization initiator. For a copolymer to be acceptable in a feed, the content of impurities (residual monomers, oligomers) needs to be as low as possible, i.e. less than 1 ppm and preferably less than 0.2 ppm.

Various processes for purifying styrene vinylpyridine copolymers are known. For example, one process consists in entraining the residual monomers with steam. However, only contents of residual monomers in the region of 10 ppm may be obtained by means of this process. Furthermore, the use of such a process makes it difficult to remove oligomers and, where appropriate, the degradation products of the polymerization initiator.

European Patent Application EP 0,020,279 teaches the purification of polar polymers by a process which consists in dissolving the polymer in a suitable organic solvent, crosslinking the polymer with a crosslinking agent such as succinic acid to form a high molecular weight insoluble crosslinked polymer, solubilizing the crosslinked polymer, then precipitating the crosslinking agent and finally separating the purified polymer.

The separation of the high and low molecular weight products may also be accomplished according to the process described in European Patent Application EP 0,176,642, which consists in selectively dissolving the residual monomers and the low molecular weight products on the basis of the difference in pKa between the high molecular weight products and those of low molecular weight.

However, while these processes can lead to satisfactory results, their implementation is arduous and difficult.

It is also known from Japanese Patent Application JP 84/189,595 to purify polyacetylenes, whose nature and properties are different from those of basic copolymers, by extraction with supercritical carbon dioxide.

It has now been found, and this forms the subject of the present invention, that styrene/vinylpyridine copolymers containing residual monomers may be purified by extraction of the said monomers with supercritical carbon dioxide, followed by recovery of the purified copolymer. In this way, it is possible to obtain a copolymer in which the content of residual monomers is less than or equal to 1 ppm.

Compared with liquid solvents, supercritical fluids possess greater ability to diffuse and lower density and viscosity. With a substantially lower viscosity and a greater ability to diffuse, supercritical fluids can be products of choice for carrying out selective extractions. In order to carry out a selective extraction with a supercritical fluid under industrially acceptable temperature and pressure conditions, the supercritical fluid must have suitable critical data (temperature, pressure) values and possess sufficient solubilizing power with respect to the product to be purified.

Carbon dioxide, whose critical coordinates are 31° C. for the temperature and 73 bars for the pressure, is used in the process of the invention. It has been found that a good separation of the impurities present in a styrene/2-vinylpyridine copolymer is accomplished using supercritical carbon dioxide, working at a temperature of between 35° and 60° C. and at a pressure of between 80 and 250 bars, and preferably between 200 and 240 bars.

The process of the invention consists in bringing supercritical carbon dioxide in a reactor into contact with the crude product of copolymerization of styrene with vinylpyridine, passing a stream of supercritical carbon dioxide into the reactor at equilibrium (temperature, pressure) and recovering the entrained extracts at a temperature of between 25° and 30° C. and at a pressure of between 40 and 70 bars, the composition of these extracts being monitored by suitable detection methods. After removal of the "light" products, the purified copolymer is drawn off from the reactor.

The process according to the invention enables a purified copolymer to be obtained directly without the need to perform additional treatments, the carbon dioxide being removed directly.

The examples which follow illustrate the invention.

EXAMPLES 1 TO 3

(a) Preparation of the styrene/2-vinylpyridine copolymer

A mixture (100 kg) of styrene and 2-vinylpyridine (30:70 by weight) containing 1% of initiator (azobisisobutyronitrile) is added in the course of 1 hour at a temperature of 65° C. to water (250 liters) containing 0.5% of amphiphilic surfactant (Rhodoviol 25/140). The polymerization is continued for 22 hours.

A steam distillation is then performed under reduced pressure at a temperature in the region of 65°–75° C. for 6 hours. The condensed volume is in the region of 100 liters.

A steam distillation is then performed at atmospheric pressure at a temperature in the region of 95°–100° C. for 6 hours. The condensed volume is in the region of 200 liters.

After the mixture is cooled, the styrene/2-vinylpyridine copolymer is separated by filtration, washed by immersion in water (250 liters), drained and then dried under reduced pressure (20 mm Hg; 2.7 kPa) for 48 hours at 65° C. and then for 24 hours at 80° C.

The copolymer thereby obtained possesses the following characteristics:

| | |
|---|---|
| nitrogen content | 9.10% |
| styrene/2-vinylpyridine composition | 31.5:68.5 by weight |
| specific viscosity (dimethylformamide, c = 0.5 at 20° C.) | 0.610 |
| residual monomers: styrene | in the region of 10 ppm |
| 2-Vinylpyridine | in the region of 10 ppm |
| tetramethylsuccinonitrile | in the region of 110 ppm |
| molecular mass (number average) $\overline{M_n}$ | 126,000 |
| molecular mass (weight average) $\overline{M_w}$ | 395,000 |
| $\dfrac{\overline{M_w}}{\overline{M_n}}$ | 3.13 |

(b) Extraction with supercritical carbon dioxide

A cylindrical tube closed at its ends with two sintered glass plates (porosity: 10 μm), containing the copolymer to be purified, is introduced into an extraction autoclave having a volume of 300 cc.

The reactor is thermostatted at the desired temperature and carbon dioxide is then admitted until a pressure of 220 bars is attained.

The pressure is then regulated by means of a discharging device.

When the whole system is at equilibrium, a stream of supercritical carbon dioxide is passed in at the rate of 2.9 kg/hour.

The extracts are recovered, on the far side of the discharging device, in a jacketed separating autoclave, at a temperature in the region of 30° C. and at a pressure of 50 to 60 bars. The extraction time varies from 2 to 6 hours.

The separating autoclave incorporates two sight glasses enabling the level of the liquid carbon dioxide to be visualized. By admission of hot water into the jacket, the carbon dioxide is distilled off continuously under pressure.

The extracts are isolated after the separating autoclave has been washed with a methylene chloride/ethanol (1:1 by volume) mixture and the solvent evaporated.

The constituents of the dry extracts are identified by infrared spectrophotometry, the mass spectrum and the nuclear magnetic resonance spectrum.

The purified copolymer, which is drawn off from the extractor, is analysed by gas chromatography in order to determine the content of residual monomers.

The results of different tests are collated in Table I:

TABLE I

| | Parameters | Example 1 | Example 2 | Example 3 |
|---|---|---|---|---|
| Conditions of carrying out the process | Weight (g) of styrene/2-vinylpyridine copolymer | 105.35 | 54.37 | 53.10 |
| | Extraction conditions | | | |
| | pressure (bars) | 220 | 220 | 220 |
| | temperature (°C.) | 40 | 40 | 60 |
| | density of the super-critical $CO_2$ | 0.86 | 0.86 | 0.75 |
| | flow rate of $CO_2$ (kg/h) | 2.9 | 2.9 | 2.9 |
| | Separation conditions | | | |
| | pressure (bars) | 50 | 60 | 60 |
| | temperature (°C.) | 29 | 30 | 30 |
| Results | Change in weight of the copolymer (cumulative in g) after: | | | |
| | 1 hour | — | 0.60 | 0.60 |
| | 2 hours | 1.05 | 0.60 | 0.61 |
| | 3 hours | — | 0.60 | 0.61 |
| | 6 hours | 1.15 | — | — |
| | Degree of extraction % after: | | | |
| | 1 hour | | 1.10 | |
| | 2 hours | | | 1.15 |
| | 6 hours | 1.1 | | |
| | Concentration of monomers (styrene) in the copolymer. | 1–2 ppm | 1–2 ppm | less than 1 ppm |

We claim:

1. A process for producing a copolymer of styrene and a vinylpyridine containing 10 to 50% by weight of styrene units having a content of residual monomers less than or equal to 2 ppm from a said styrene/vinylpyridine copolymer contaminated with residual monomers which comprises contacting the said copolymer with supercritical carbon dioxide at a temperature between 35° and 60° C. and at a pressure between 80 and 250 bars for 1 to 6 hours, recovering the entrained extracts at a temperature of between 25° and 30° C. and at a pressure of between 40 and 70 bars, and recovering the purified copolymer.

2. Process according to claim 1, wherein the said copolymer is a styrene/2-vinylpyridine copolymer containing 30 percent by weight of styrene units.

* * * * *